No. 769,732. PATENTED SEPT. 13, 1904.
F. E. FARNHAM.
CUFF BUTTON.
APPLICATION FILED JULY 3, 1903.
NO MODEL.
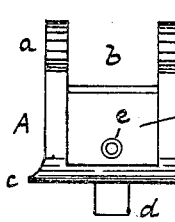
FIG. 1.
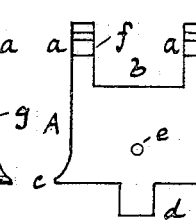
FIG. 2.
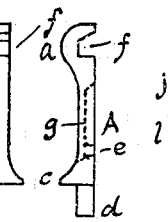
FIG. 3.
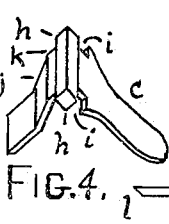
FIG. 4.
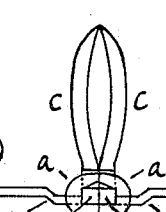
FIG. 5.
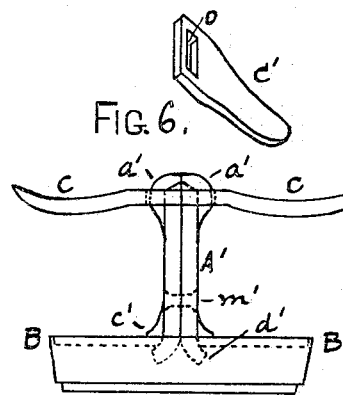
FIG. 6. FIG. 7.
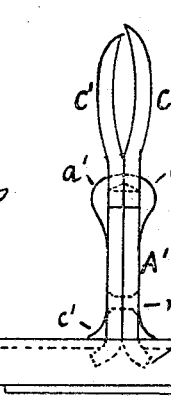
FIG. 8.
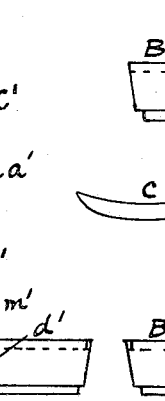
FIG. 9.
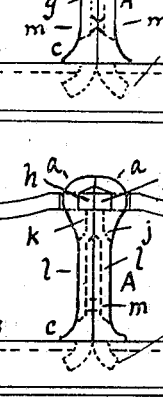
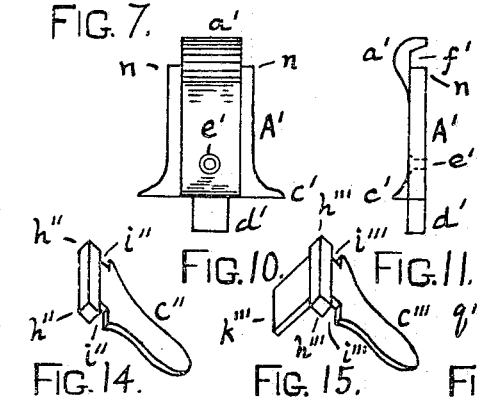
FIG. 10. FIG. 11.
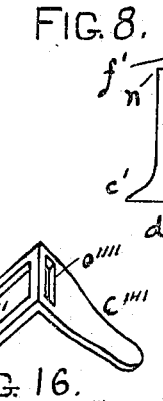
FIG. 12.
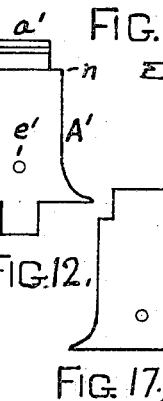
FIG. 13.
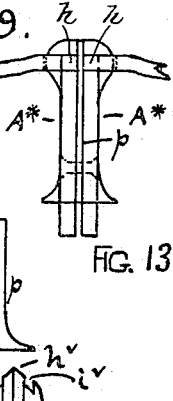
FIG. 14. FIG. 15. FIG. 16. FIG. 17.
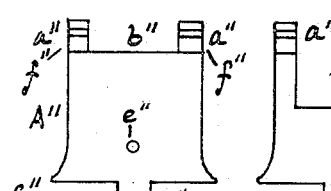
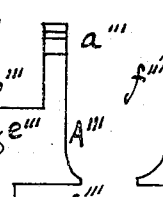
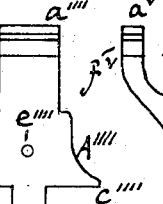
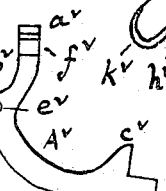
FIG. 22.
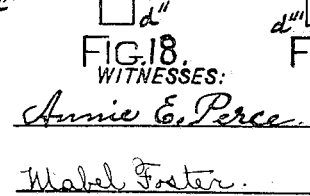
FIG. 18. FIG. 19. FIG. 20. FIG. 21.
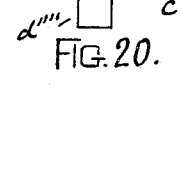
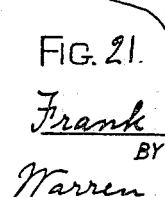
WITNESSES:
Annie E. Perce
Mabel Foster
INVENTOR
Frank E. Farnham
BY
Warren R. Perce
ATTORNEY.

No. 769,732. Patented September 13, 1904.

UNITED STATES PATENT OFFICE.

FRANK E. FARNHAM, OF PROVIDENCE, RHODE ISLAND.

CUFF-BUTTON.

SPECIFICATION forming part of Letters Patent No. 769,732, dated September 13, 1904.

Application filed July 3, 1903. Serial No. 164,166. (No model.)

*To all whom it may concern:*

Be it known that I, FRANK E. FARNHAM, a citizen of the United States, residing at Providence, in the county of Providence and State of Rhode Island, have invented certain new and useful Improvements in Cuff-Buttons, of which the following is a specification, reference being had therein to the accompanying drawings.

Like letters indicate like parts.

Figure 1 is a front elevation of one of the post-sections of my improved cuff-button. Fig. 2 is a rear elevation of the same. Fig. 3 is a side elevation of said post. Fig. 4 is a perspective view of one of the bent levers forming a part of my invention. Fig. 5 is a side elevation of my improved cuff-button with the lever-arms thereof extended in position to pass through the buttonholes of the cuff. Fig. 6 is a perspective view of a modified form of one of the lever-arms. Fig. 7 is a side elevation of a modified form of said cuff-button with the lever-arms thereof extended at right angles from the post in wearing position. Fig. 8 is a side elevation of said modified form of the cuff-button with the lever-arms in entering position. Fig. 9 is a side elevation of my improved cuff-button shown in Fig. 5 with the lever-arms thereof in wearing position. Figs. 10, 11, 12, 13, 14, 15, 16, 17, 18, 19, 20, 21, and 22 are various modified forms of parts of my said invention, as will be more fully explained hereinafter.

My invention relates to that class of cuff-buttons which has two oppositely-swinging lever-arms pivotally mounted upon a post. These lever-arms are extended in the plane of the post until their outer ends meet for the purpose of inserting said lever-arms through the buttonhole of the cuff, but after such insertion are extended at opposite right angles to the post to hold the cuff-button in position.

My invention consists of the novel construction and combination of the several parts of the device, as hereinafter fully described, and specifically set forth in the claims.

In the drawings, A is one of the post-sections of my improved cuff-button. Each post-section A has parallel projections $a\ a$, with the intermediate slot or rectangular opening $b$, the outwardly-flaring base $c$, the tang $d$, and the rivet-hole $e$. The extremity of each projection $a$ is curved and on its inner or rear side is made with a three-sided seat $f$, having a straight center and one outwardly-diverging side and the other side at a right angle with said center, as fully illustrated in Fig. 3. Each section of this post has a rectangular recess $g$ in its outer side. (Shown in solid lines in Fig. 1 and in dotted lines in Fig. 5.)

B is the back-plate or lining of the ornamental head or front of the cuff-button, and it is provided with a central rectangular slot for the reception of the tangs $d\ d$.

There are two bent lever-arms C C, one of which is shown in Fig. 4. Each lever-arm C is bent transversely about midway its length, which bend is to the extent of ninety degrees. In each of the lever-arms are formed four slots, as shown in Fig. 4, so as to leave intermediate projections or pivots, which are rectangular in cross-section. These projections or pivots are designated in the drawings as $h$ and said slots as $i$. One portion or arm of the bent lever C is angularly bent, as seen at $j$. The portions $k$ and $l$ extend in planes parallel with each other, but all integral.

The several parts are assembled as follows: A lever-arm C has its projecting ears or pivots $h\ h$ inserted in the seats $f\ f$ of one post-section A, and another lever-arm C has its projecting ears or pivots $h\ h$ inserted in the seats $f\ f$ of another post-section A. The rear surfaces of said post-sections A (those surfaces seen in Fig. 2) are placed in abutment with each other, as illustrated in Fig. 5, and a rivet $m$ is inserted in the holes $e\ e$ of said two post-sections A and hammered down, as seen in said Fig. 5. The post-sections A are made of stock having the required degree of resiliency, and as they are thus tightly fastened together near the inner end their outer ends are capable of a slight spring action. The parallel projections $a\ a$ of each post-section enter loosely the slots $i\ i$ of the bent lever-arm C. The tangs $d\ d$ after insertion in the central rectangular slot in the back-plate B of the button are bent in opposite directions outwardly, as indicated by dotted lines in Figs. 5 and 9, and thus firmly unite and secure the inner end of the post-sections A A to the back-plate B, the flaring base $c$ resting on said plate.

The position of the lever-arms C C when they are to be inserted in the buttonhole of the cuff is shown in Fig. 5. As there seen, said lever-arms are curved and meet in a common line at their outer ends in the plane of the button-post A, but their portions $l\,l$ extend at right angles from the post-sections A A in opposite directions. When the curved portions of the lever-arms C C have been fully thrust through the buttonhole, the portions $l\,l$ of the lever-arms coming then in contact with the front surface of the cuff are forced downward to the post-sections A A until said portions $l\,l$ are received in the recesses $g\,g$ on the outer surfaces of the post-sections A A. When the portions $l\,l$ of the lever-arms are thus seated in the recesses $g\,g$ of the post-sections A A, the curved portions of the lever-arms C C extend at right angles from the post-sections A A in opposite directions, as shown in Fig. 9, thus confining the cuff-button in the buttonholes of the cuff.

The angularity of the pivots $h\,h$, pivotally mounted in the angular seats $f\,f$ of the curved parallel projections $a\,a$ of the post-sections A A, give the requisite spring or snap action sufficient to hold the curved portions of the lever-arms C C rigidly in place, whether they are extended in the entering or wearing position, as will be readily understood by an examination of Figs. 5 and 9, while when the curved portion of the lever-arms C C extend in a position midway between their positions shown in Figs. 5 and 9 the diagonal diameters of said pivots $h\,h$ as said pivots turn forcibly spread apart the open outer ends of the two post-sections A A, which, however, resume their natural position as soon as either square face of the pivots $h\,h$ come into contact with the inner straight central surface of the seats $f\,f$ of the post-sections A A.

In the remaining figures of the drawings are shown various modifications of this device. In Figs. 6, 7, 8, 10, 11, and 12 the post-sections are designated as A' and the lever-arms as C'. The post-section A' has its central portion $a'$ projecting, as before described, and provided with a seat $f'$. It has the flaring base $c'$, the tang $d'$, and the rivet-hole $e'$; but the post-section A' is wider than the projection $a'$, leaving two shoulders $n\,n$. The lever-arm C' shown in Fig. 6 is not bent, and instead of having projecting pivots it has a slot $o$. The projections $a'\,a'$ extend through the slots $o\,o$ of the lever-arms C' C'. The post-sections A' A' are riveted together, as seen at $m'$ in Fig. 7. In this construction the outer end of one of the lever-arms C' should slightly project beyond the outer end of the other of the lever-arms C' when said lever-arms C' C' are extended in the entering position, (illustrated in Fig. 8,) because in this construction the device is not automatic; but when the lever-arms C' C' have been fully thrust through the buttonhole of the cuff the lever-arms C' C' must be separately turned down by hand to the wearing position, (shown in Fig. 7,) though the reverse movement in withdrawing the cuff-button from the buttonhole is automatic, as is evident by an inspection of Figs. 7 and 8.

In Fig. 17 is shown a thin piece of sheet metal $p$, (having no tang,) which, as seen in Fig. 13, is inserted between the post-sections A* A*, against the opposite sides of which inserted piece the squared pivots $h\,h$ press and pass in turning instead of bearing against each other.

In Figs. 14 and 18 is shown another modified form of the device, in which the lever-arm C″ is the same as the lever-arm C shown in Fig. 4, except that it does not have the portions designated as $j$, $k$, and $l$ in Fig. 4. Here the lever-arm C″ has the squared pivoted ears $h''\,h''$ and the rectangular slots $i''\,i''$. The post-section A″ has the parallel projections $a''\,a''$, the flaring base $c''$, the tang $d''$, the rivet-hole $e''$, and the seats $f''\,f''$; but the rectangular slot $b''$ is not so deep as the slot $b$ in Figs. 1 and 2.

In Figs. 15 and 19 is shown another modified form of the device. Here the lever-arm C‴ does not have the angular bend $j$ and the extension $k$, (shown in Fig. 4,) but does have the squared pivotal ears $h'''\,h'''$, the rectangular slots $i'''\,i'''$, and the bent portion $k'''$. The post-section A‴ for this construction has the projections $a'''$ and the rectangular slot $b'''$, which is much deeper than the slot $b$ in Figs. 1 and 2 and sufficiently large to receive the end $k'''$ of the lever-arm C‴, so that the said end $k'''$ is wholly received in said slot $b'''$. Seats $f''''$ are formed in the projections $a'''$. A tang $d'''$ projects from the base $c'''$.

In Figs. 16 and 20 is shown still another modified form of my invention. Here the lever-arm $c''''$ has a rectangular slot $o''''$, like the slot $o$ in Fig. 6; but there are provided two long parallel projections $q''''\,q''''$. The post-section A″″ has the extended projection $a''''$, with the seats $f''''$ therein, the flaring base $c''''$, the tang $d''''$, and the rivet-hole $e''''$.

In Figs. 21 and 22 my said invention is illustrated as applied to a link-button. Here A$^v$ is one of the post-sections, curved as required for a link-button. $a^v$ are the projections, having the seats $f^v$. $b^v$ is a U-shaped slot; $c^v$, the base; $d^v$, the tang, and $e^v$ the rivet-hole. The bent lever C$^v$ has the squared pivots $h^v$, slots $i^v$, and the arm $k^v$, the latter convexed at its outer end to enable it to occupy the slot $b^v$ of the post-section A$^v$.

In all these forms the same mechanical principle is involved. They all act automatically in swinging the lever-arms ninety degrees from the wearing position to the entering position when the cuff-button is removed from the buttonholes of the cuff. Those shown in Figs. 5, 9, 15, 16, and 22 are automatic in swinging the lever-arms ninety degrees from the entering position to the wearing position; but those shown in Figs. 7, 8, and 14 are not automatic in swinging the lever-arms ninety degrees from the entering position to the wearing position, but must be spread apart or moved by the fingers.

As the lever-arms are pivoted at almost the very extremity of the post-sections, it is possible to use in my improved cuff-button a much shorter post than has heretofore been necessary in cuff-buttons of this class.

I claim as a novel and useful invention and desire to secure by Letters Patent—

1. The improved cuff-button herein described, consisting of a button-head, two resilient post-sections having their inner surfaces in abutment and each having two parallel projections terminating in a curved end which is provided with an angularly-shaped seat and also having a base and a tang, the latter adapted to enter and engage said button-head, two bent lever-arms each having at its bend two oppositely-directed projections or pivots which are rectangular in cross-section, which four squared pivots or projections of said bent levers are rotatably mounted in the two seats of the post-sections when said seats register one with the other, and a rivet passing through the two post-sections and fastening the same together near the inner end thereof, substantially as specified.

2. The improved cuff-button herein described, consisting of the button-head B, the two post-sections A, A, each having the parallel curved projections $a$, $a$, in which a seat $f$ is provided and also having the rectangular slot $b$, the recess $g$, the rivet-hole $e$, the flaring base $c$ and the tang $d$, the bent lever-arms C, C, each having at its bend the pivots $h$, $h$, rectangular in cross-section, the slots $i$, $i$, the straight surfaces $k$, $l$, with the intermediate portion $j$ all integral, and the rivet $m$ fastening the post-sections A A together through the holes $e$, $e$, all arranged, combined and operating substantially as specified.

In testimony whereof I affix my signature in presence of two witnesses.

FRANK E. FARNHAM.

Witnesses:
WARREN R. PERCE,
HOWARD A. LAMPREY.